United States Patent [19]
Gu et al.

[11] Patent Number: 5,333,034
[45] Date of Patent: Jul. 26, 1994

[54] SYSTEM FOR SELECTIVELY CONTROLLING THE SPECTRAL MAKE-UP OF VISIBLE LIGHT FROM A SOURCE THEREOF

[75] Inventors: Xue M. Gu, Shawnee; David B. Johnson, Leawood; Michael S. Haines, Prairie Village; Louis P. Armstrong, Kansas City, all of Kans.

[73] Assignee: Bremson Data Systems, Inc., Lenexa, Kans.

[21] Appl. No.: 829,779

[22] Filed: Jan. 31, 1992

[51] Int. Cl.⁵ ...................... G03B 27/32; G03B 27/72
[52] U.S. Cl. ........................................ 355/32; 355/35; 355/71
[58] Field of Search ............... 355/32, 35, 38, 68, 355/77, 70, 71; 358/76, 80; 359/30, 885–889

[56] References Cited

U.S. PATENT DOCUMENTS

| | | |
|---|---|---|
| 3,011,388 | 12/1961 | Baumbach et al. |
| 3,322,025 | 5/1967 | Dauser. |
| 3,552,288 | 1/1971 | Corley .................. 355/35 X |
| 3,643,294 | 2/1972 | Wilson .................. 355/35 |
| 3,700,960 | 10/1972 | Lake .................... 315/151 |
| 3,702,733 | 11/1972 | Sokolow. |
| 3,754,824 | 8/1973 | Weisglass et al. ........ 355/35 |
| 3,818,216 | 6/1974 | Larraburu .............. 355/71 X |
| 3,887,279 | 6/1975 | Rubin ................... 355/38 |
| 4,068,943 | 1/1978 | Gyori ................... 355/38 |
| 4,124,292 | 11/1978 | Van Wandelen .......... 355/70 X |
| 4,589,766 | 5/1986 | Fürsich et al. ......... 355/38 |
| 4,707,118 | 11/1987 | Terashita .............. 355/38 |
| 4,942,424 | 7/1990 | Terashita et al. ....... 355/38 |
| 4,992,700 | 2/1991 | Lake ................... 313/642 X |
| 5,028,843 | 7/1991 | Narita ................. 313/641 |
| 5,084,729 | 1/1992 | Yakubo et al. ......... 355/71 X |

*Primary Examiner*—D. Rutledge
*Attorney, Agent, or Firm*—Hovey, Williams, Timmons & Collins

[57] ABSTRACT

A preferred photographic printer (10) includes light filters (52, 54, 56) which can be shifted to selected positions for filtering respective spectral components from selected portions of a light beam (100) in order to vary the spectral make-up of the light beam, and further includes a preferred metal halide lamp (48) which produces a spectral output with substantial portions in the visible band.

20 Claims, 6 Drawing Sheets

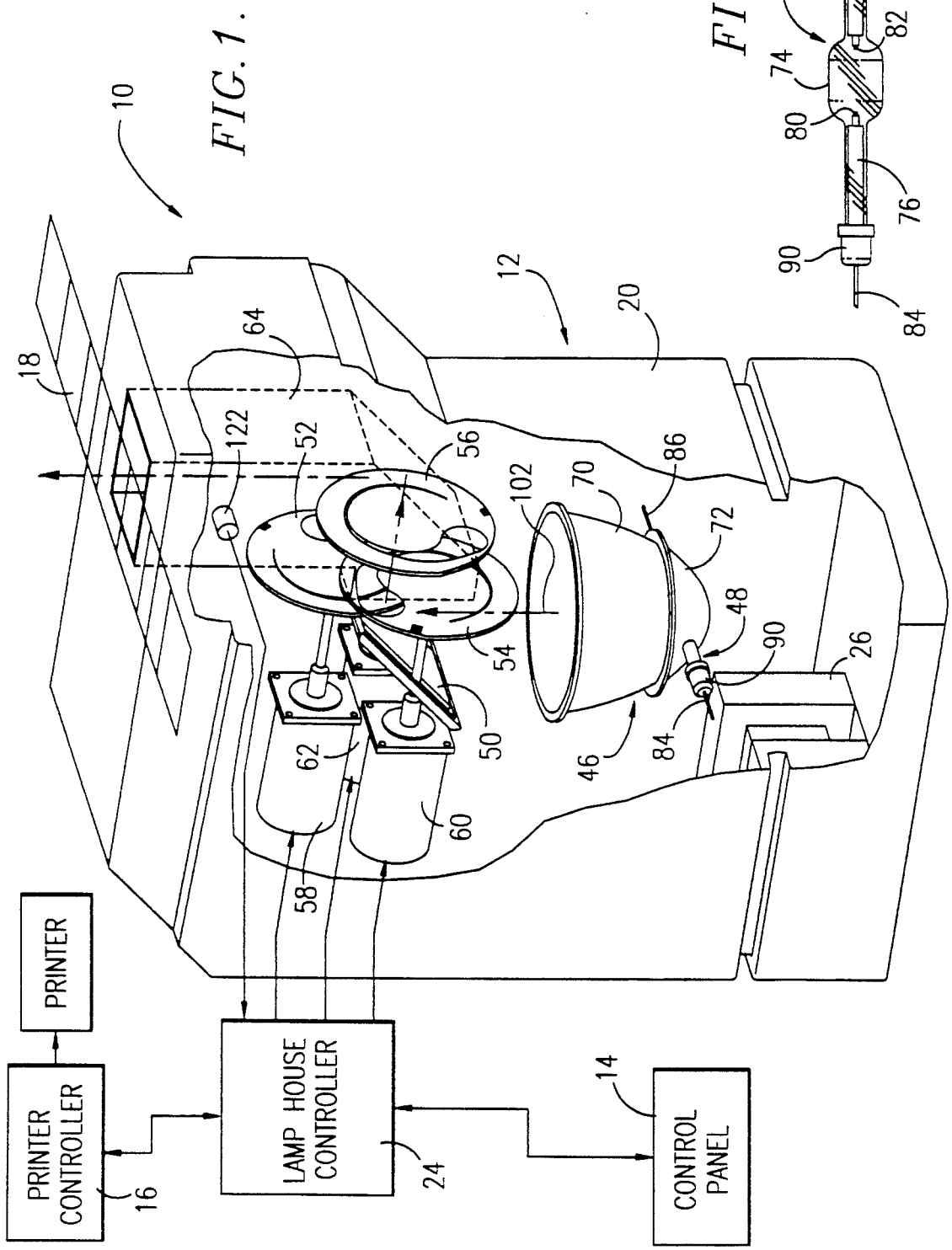

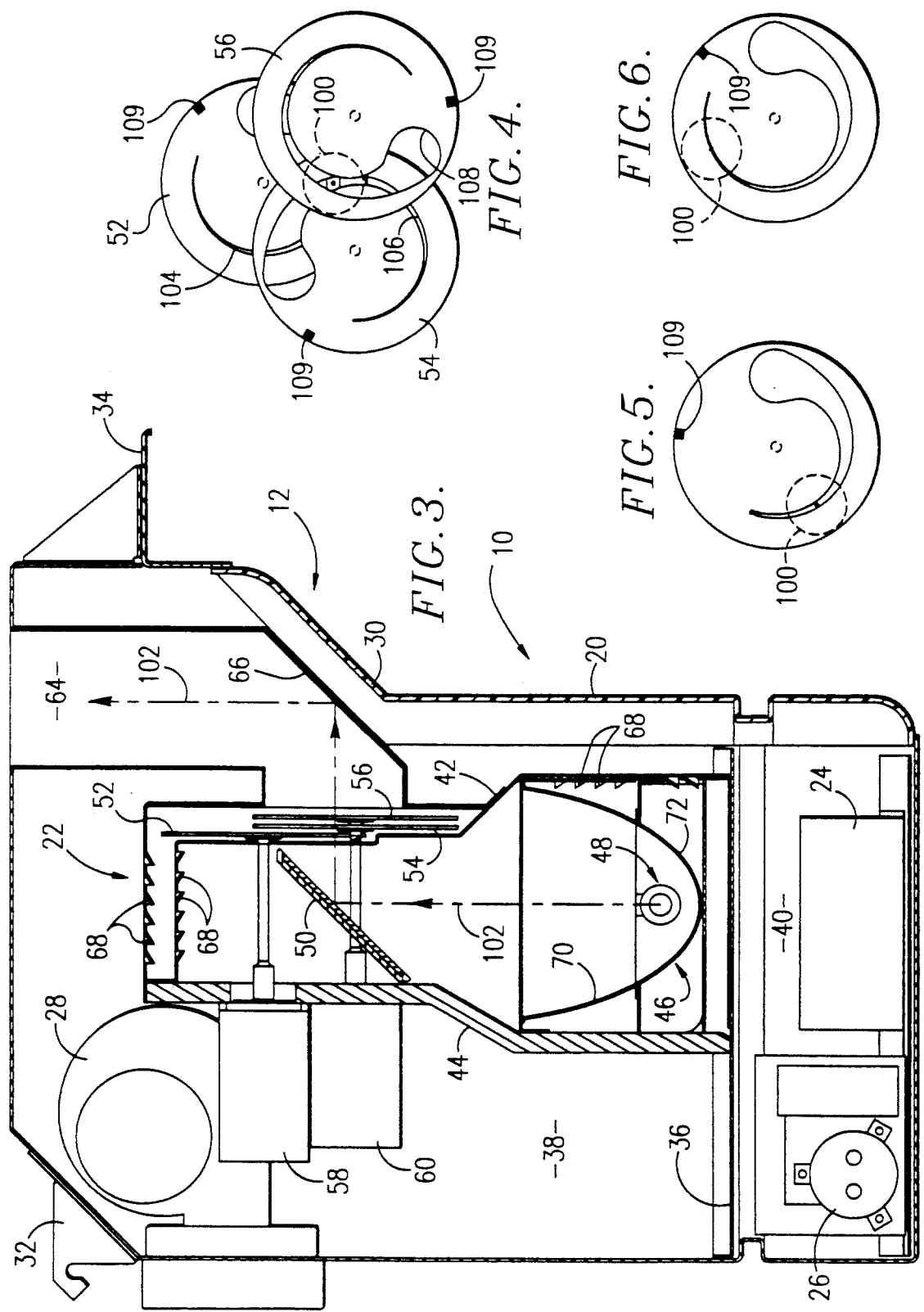

SYSTEM FOR SELECTIVELY CONTROLLING THE SPECTRAL MAKE-UP OF VISIBLE LIGHT FROM A SOURCE THEREOF

BACKGROUND OF THE INVENTION

1. Field of the Invention

The present invention relates to the field of photographic printers. Additionally, the invention is concerned with a lamphouse having a lamp in which a significantly greater percentage of the spectral make-up of the light beam therefrom is contained within the visible band as compared to a conventional tungsten lamp, and having light filters which can be shifted over a range of positions for selectively varying the respective intensities of the spectral components of the light beam.

2. Description of the Prior Art

A typical photographic printer of the prior art includes a lamphouse from which a beam of light is directed through photographic film onto photographic paper for producing a print. For conventional color prints, the photographic paper includes three layers of photosensitive dyes each of which responds to a different primary color, i.e., red, green and blue. Additionally, each dye responds with a different sensitivity to its respective primary color. To produce a high quality photograph, the printer exposes the dyes to the primary colors of the light beam for different lengths of time or different intensities in order to compensate for the different sensitivities of the dyes, for under or over exposure of the negative, and for variations in the dyes from one batch of paper to the next.

Three light filters cyan, magenta and yellow are included in the lamphouse to control the spectral make-up of the light beam emanating therefrom in order to achieve the desired exposure of the photographic paper to the three primary colors. A typical light filter is in the form of a "filter flag" comprised of a sheet of filter material extending from a solenoid controlled arm. Each light filter is operable to subtract or filter a primary color from the light beam, that is, a respective red, green or blue fractional portion the visible spectrum. This is known as subtractive or variable time mode printing.

During the first part of an exposure, unfiltered light, that is, white light, is directed through the negative onto the photographic paper in order to expose all of the dyes to the full spectrum. At the end of this time, the solenoid controlling the first filter is activated and this filter drops into the path of the beam in order to filter its portion of the spectrum from the beam. After an additional time, the second filter drops into place and an additional portion of the spectrum is subtracted. At the end of the exposure time, the third filter drops into place which subtracts the remaining portion of the spectrum from the beam which marks the end of the exposure time.

The typical prior art lamphouse of the printer described above uses an incandescent lamp having a tungsten filament. Use of such a lamp presents a number of problems because only about ten percent of the light output is in the visible band with the remaining ninety percent being in the infrared band among other losses. In addition to representing low power efficiency, the low level of visible light output requires longer exposure times which results in low productivity. Furthermore, the heat generated by the infrared must be dissipated so that the film negative and photographic paper are not damaged which requires ventilation and heat sink construction of the lamphouse adding to its cost. Increasing the wattage of the lamp is not a practical solution for increasing the intensity of the usable visible light because this also increases the amount of heat generated and merely adds to the inefficiency of the unit.

The spectral make-up of the visible light generated by the prior art incandescent lamp also represents inefficiency because the photographic paper dyes present peaks of sensitivity in their primary color portion of the spectrum, but the output of the lamp is continuous across the visible band. Additionally, the sensitivities of the dyes present cross-over areas which are affected by the generally uniform lamp output over the visible band.

The prior art filter flags also present problems because they experience "bounce" when they drop into position. During the bounce, unfiltered light leaks through which alters the intended spectral make-up of the beam and thereby affects the exposure. This problem becomes more acute with short exposure times in the range of 300 milliseconds, for example.

The prior art lamphouse described above also presents limited utility because it can only be operated in the "subtractive" mode. This means that each primary color is delivered at full intensity for part of the exposure time and then filtered, i.e., subtracted, entirely from the beam by the associated flag filter for the remainder of the exposure time. This results in an "average" level of exposure for each primary color, but such does not present the same photographic results as "additive" or variable intensity operation which exposes the dyes to all three colors at differing intensities for the entire exposure time. This difference comes about because of the time sensitivities of the dyes and because of the cross-over characteristics of dye sensitivities.

One prior art lamphouse which can operate in an additive mode uses three white light sources. Each light source is filtered so that the output represents a primary color which is then trimmed using trim filters to produce the desired level of primary color intensity. The respective primary color outputs are then combined into a single beam. As can be appreciated, the additive lamphouses are even less power efficient than subtractive lamphouses because only one-third of the visible spectrum from each lamp is used. Additionally, the trim filters often cannot be adjusted quickly and reliably enough for efficient production.

Another prior art lamphouse is disclosed in U.S. Pat. No. 3,754,824 which is concerned with a lamphouse having three dichroic filters which are operable to partially intercept a white light beam. These filters are manually adjustable and use a cam arrangement to produce a selected filter position. The filters engage the light beam from one side and can be progressively inserted in the beam to increase the filtering action. When low spectral component intensity is selected, only a small sliver of the periphery of the beam passes by the filter unattenuated. This presents a problem, however, in that the intensity of the beam diminishes outwardly from the center in a nonlinear fashion and as a result, it is very difficult to control and repeat a desired intensity at very low levels.

SUMMARY OF THE INVENTION

The present invention solves the prior art problems outlined above and provides a distinct advance in the state of the art. That is to say, the system hereof provides for highly efficient production of visible light presenting a spectral make-up matching that of the photographic dyes and allows efficient and reliable operation in both variable intensity and variable time modes.

Broadly speaking, the preferred system includes a printer with a lamphouse having a metal halide light source which produces a beam having spectral intensity peaks which substantially correspond to photosensitivity peaks of photographic dyes, and having light filters which can be selectively positioned in the light beam to achieve a desired level of intensity for each primary color. The preferred light filter is in the form of rotatable disk having filter material operable for filtering a component of the visible spectrum. The filter can be precisely rotated to a position relative to the light beam for filtering the spectral component from a portion of the beam without filtering this component from the remaining beam portion in order to achieve a desired level of spectral component intensity.

BRIEF DESCRIPTION OF THE DRAWINGS

FIG. 1 is a schematic representation of the invention illustrating the preferred printer and lamphouse with portions thereof cut away to illustrate interior components;

FIG. 2 is a side elevational view of the preferred lamp for use in the lamphouse of FIG. 1;

FIG. 3 is a side sectional view of the preferred lamphouse;

FIG. 4 is an elevational view of the preferred filter disks of the lamphouse with a light beam shown in dashed lines;

FIG. 5 is an elevational view of the preferred filter disk for use in the subtractive mode;

FIG. 6 is an elevational view of the preferred filter disk for use in the additive mode;

DETAILED DESCRIPTION OF THE PREFERRED EMBODIMENT

Figure 7:
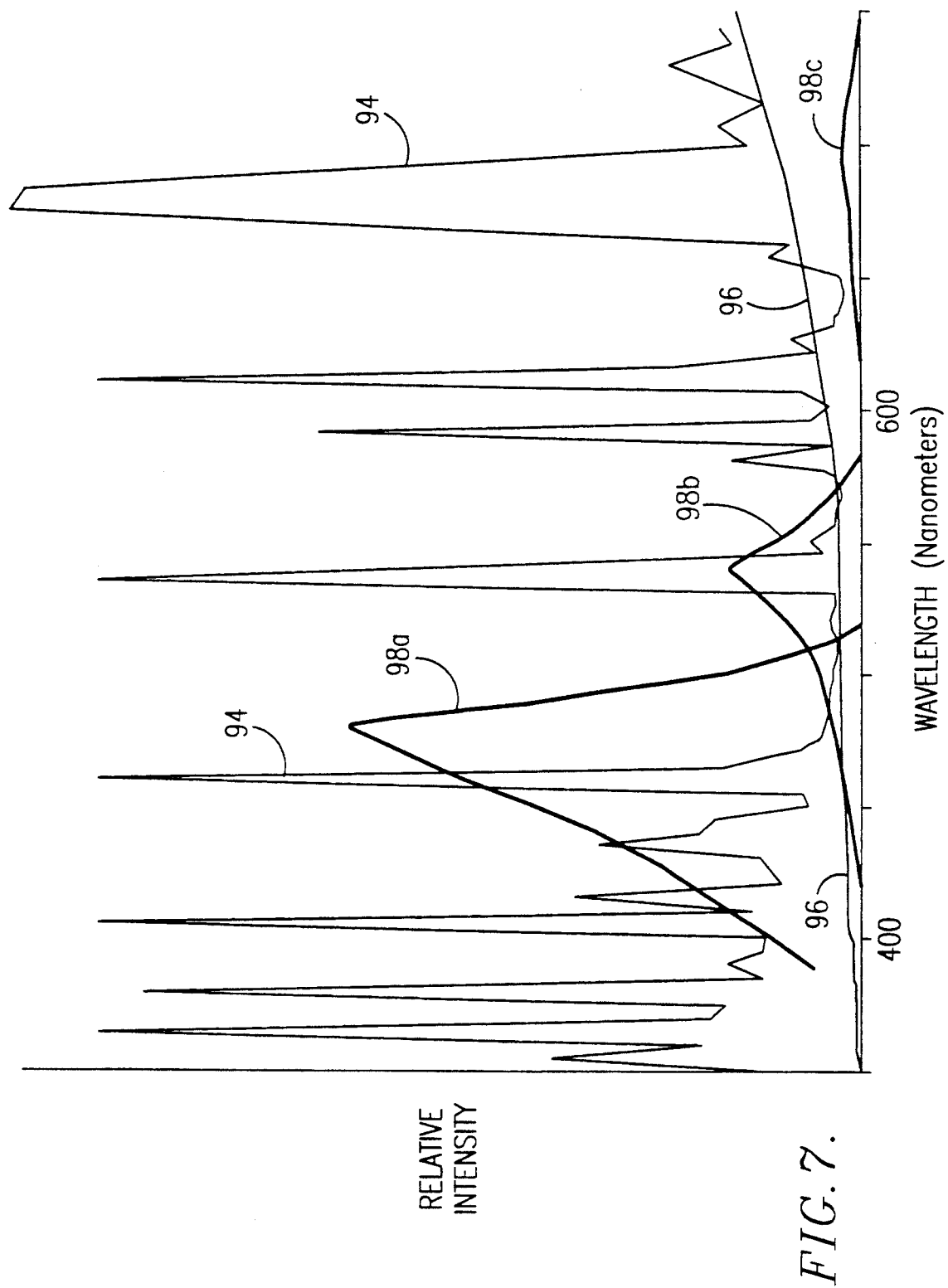
FIG. 7 is a graphical illustration of the relative intensities versus wavelength for the lamp output of the present invention, for a prior art tungsten lamp (semi-bold lines), and for photographic dye sensitivities (bold lines)

FIG. 1 schematically illustrates photographic printer 10 of the present invention which includes lamphouse 12 having control panel 14. Printer 10 includes printer controller 16 which controls printer operation for producing photographic prints by passing a controlled light beam through photographic negatives 18 onto photographic paper (not shown) having layers of photosensitive dyes thereon.

Referring to FIG. 3, preferred lamphouse 12 includes housing 20 having light beam assembly 22, lamphouse controller 24, power supply 26, and ventilation fan 28. Housing 20 includes outer walls 30, hook-shaped mounting bracket 32, mounting clip 34, and interior bulkhead 36 which defines upper compartment 38 containing assembly 22 and fan 28 and lower compartment 40 containing controller 24 and power supply 26. Assembly 22 includes enclosure 42 having support wall 44, ellipsoid reflector 46, lamp 48 operably coupled with power supply 26, mirror 50 which may be tilted by a stepper motor (not shown in FIGS. 1 and 3), yellow, magenta and cyan light filters 52, 54, and 56 respectively coupled for selective rotation with stepper motors 58, 60, and 62, and light mixing chamber 64 presenting reflective surface 66.

Enclosure 42 is configured to present ventilation openings 68 by which fan 28 induces cooling air flow through enclosure 42 and mixing chamber 64. Support wall 44 extends upwardly from bulkhead 36 and provides structural strength for supporting the components of light beam assembly 22. Additionally, support wall 44 is preferably composed of aluminum of sufficient thickness to provide an effective heat sink. The entrance to mixing chamber 64 also conventionally includes a light defuser (not shown).

Ellipsoid reflector 46 includes upper section 70 and detachable lower section 72 which transversely supports lamp 48. The detachable nature of lower section 72 allows convenient replacement of lamp 48 without lamphouse disassembly.

Medium pressure, metal halide lamp 48 is shown in more detail in FIG. 2 and includes envelope 74 configured as shown as a quartz tube, and further includes electrodes 76 and 78 extending through opposed ends of envelope 74 to present respective, spaced, interior electrode ends 80 and 82 and to present respective exterior terminals 84 and 86 for coupling with power supply 26. Using conventional construction techniques, lamp 48 includes insulation 88 covering those portions of electrodes 76,78 within envelope 74 except for electrode ends 80,82, and includes end caps 90 and 92 for containing a light-emitting gas within envelope 74. Preferred lamp 48 is manufactured by Western Quartz Products and includes mercury, lithium and thallium as the preferred metal halide gases for producing the output spectrum illustrated in FIG. 7.

FIG. 7 presents graphical illustrations of relative spectral intensities versus wavelengths in the visible band. The graphs illustrated include plot 94 for preferred lamp 48 of the present invention, prior art tungsten lamp plot 96 (semi-bold), and plots 98a, b and c (bold) representative of the photosensitivities of typical photographic dyes. As those skilled in the art will appreciate, a conventional tungsten lamp as illustrated by plot 96 provides a spectral output which is continuous and which presents relatively low intensity throughout the visible band with about ninety percent of the output being in the infrared range (not shown). In addition to power inefficiency, the conventional tungsten lamp presents substantial spectral inefficiency because the output therefrom does not present spectral peaks coinciding with the sensitivity peaks of the photographic dyes (plots 98a–c).

A comparison of plots 94, 96 and 98 illustrates the distinct advance in the state of the art provided by lamp 48 of the present invention. First, substantially more of the spectral output from lamp 48 is provided in the visible band as represented by plot 94 as compared to only about ten percent of the output in the prior art tungsten lamp. This significantly increases the power efficiency of preferred lamphouse 12 and thereby photographic printer 10. Second, the spectral output from preferred lamp 48 presents intensity peaks which substantially coincide with the sensitivity peaks of typical photographic dyes as illustrated by comparison between plots 94 and 98. Third, the overall spectral intensity produced by lamp 48 is substantially greater in the visible band as compared to the tungsten lamp.

All of this leads to greatly enhanced production efficiency in the use of printer 10 because the exposure time for each print can be substantially reduced. For example, it has been found that use of lamp 48 allows for exposures about one-fourth as long as those with a prior art tungsten lamp with a of substantial increase in production. As a further benefit, the preferred lamp last up to ten times as long as the tungsten lamp, and because of the minimal heat output, less ventilation and heat sinking capability are required in the preferred lamphouse.

Returning now to FIG. 3, lamp 48 produces an output beam 100 which is directed along light path 102 by reflector 46, cold mirror 50, and reflective surface 66. Mirror 50 and surface 66 are positioned at forty-five degree angles as illustrated so that beam 100 passes through filters 52-54. Mirror 50 is a so-called "cold" mirror which operates as a heat separator and can be rotated by a stepper motor in order to diminish the overall intensity of light beam 100 to a selected level to provide a viewing level of light intensity.

Filters 52-56 are composed of disk-shaped glass substrates with coatings of dichroic materials thereon which are respectively operable for filtering separate components of the visible spectrum from light beam 100. More particularly, yellow filter 52 removes the blue third of the spectrum, magenta filter 54 filters the green third, and cyan filter 56 filters the upper red third from the spectrum. Each filter 52-56 is configured as a circular disk mounted to the shafts of respective stepper motors 58-62 and arranged in the overlapping pattern illustrated in FIG. 4. Additionally, each filter 52-56 includes respective open areas 104, 106 and 108 defined therethrough. FIGS. 4 an 6 illustrate the preferred open area configuration for a filter to be used in the "variable intensity" mode, and FIG. 5 illustrates the preferred open area configuration for filter use in the "variable time" mode.

As illustrated, each open area 104-108 presents a generally arcuate configuration extending along an arc adjacent the periphery of each disk. These open areas 104-108 present relative uniformity of change of the logarithm of the area with change in the rotational angle in order to provide precise control. More particularly, each open area is configured such that the logarithm of the ratio of the total area of said remaining beam portion passing therethrough to the balance of said open area varies linearly with the displacement of said filter relative to said beam. With this configuration the filtering ability of filters 52-56 varies linearly with each rotational step of motors 58-62. This substantially facilitates rapid and precise positioning of filters 52-56 to achieve a desired spectral composition of beam 100.

Further, each open area 104-108 presents one end having a relatively larger open area sufficient to allow beam 100 to pass therethrough unattenuated, and with the open area gradually narrowing toward the opposed end. The larger open area represents a full open position for each filter. A comparison of FIGS. 5 and 6 illustrates that the open area of the subtractive type disk of FIG. 5 is truncated for placing the filter material thereof rapidly into a full filtering position. Additionally, each filter 52-56 presents a so-called "notch" 109 which is an opaque portion placed on the periphery thereof used to indicate the "home" position of each disk as a reference to controller 24.

Flanged stepper motors 58-62 are mounted to the rearward, that is, outboard surface of support wall 44. The output shafts of motors 58-62 are coupled with the centers of filters 52-56 for selective rotation thereof. Stepper type motors are preferred because of their ability to rapidly yet precisely place filters 52-56 in selected positions to achieve the desired degree of attenuation of the spectral components of beam 100.

In use, stepper motors 58-62 are individually and independently controlled by lamphouse controller 24 for precisely positioning filters 52-56 in order to achieve a desired spectral composition of beam 100. More particularly, each filter 52-56 can be placed in an open position in which the larger open area is positioned centrally relative to beam path 102, in a full filter position in which each filter is rotated counter clockwise (as viewed in FIGS. 4-6) so that beam 100 passes entirely through the filter material, or in any of the intermediate positions therebetween. In the intermediate positions, a portion of beam 100 passes unattenuated through the open area and the remaining portion passes through the filter material. The net result is that the overall intensity of the associated spectral component is reduced to a level correlated with the filter position. The gradual narrowing of open areas 104-108 and the use of stepper motors 58-62 provides for extremely precise control over the intensities of the red, green and blue components of beam 100.

Additionally, the periphery of beam 100 is trimmed by the spaced sections of filtering materials defining open areas 104-108 while allowing the central portion of beam 100 to pass through these open areas when filters 52-56 are in any of the respective intermediate positions. This has the distinct advantage of very precise control at the lower intensity levels because it is the central portion of beam 100 which passes unattenuated through open areas 104-108.

Figure 8:
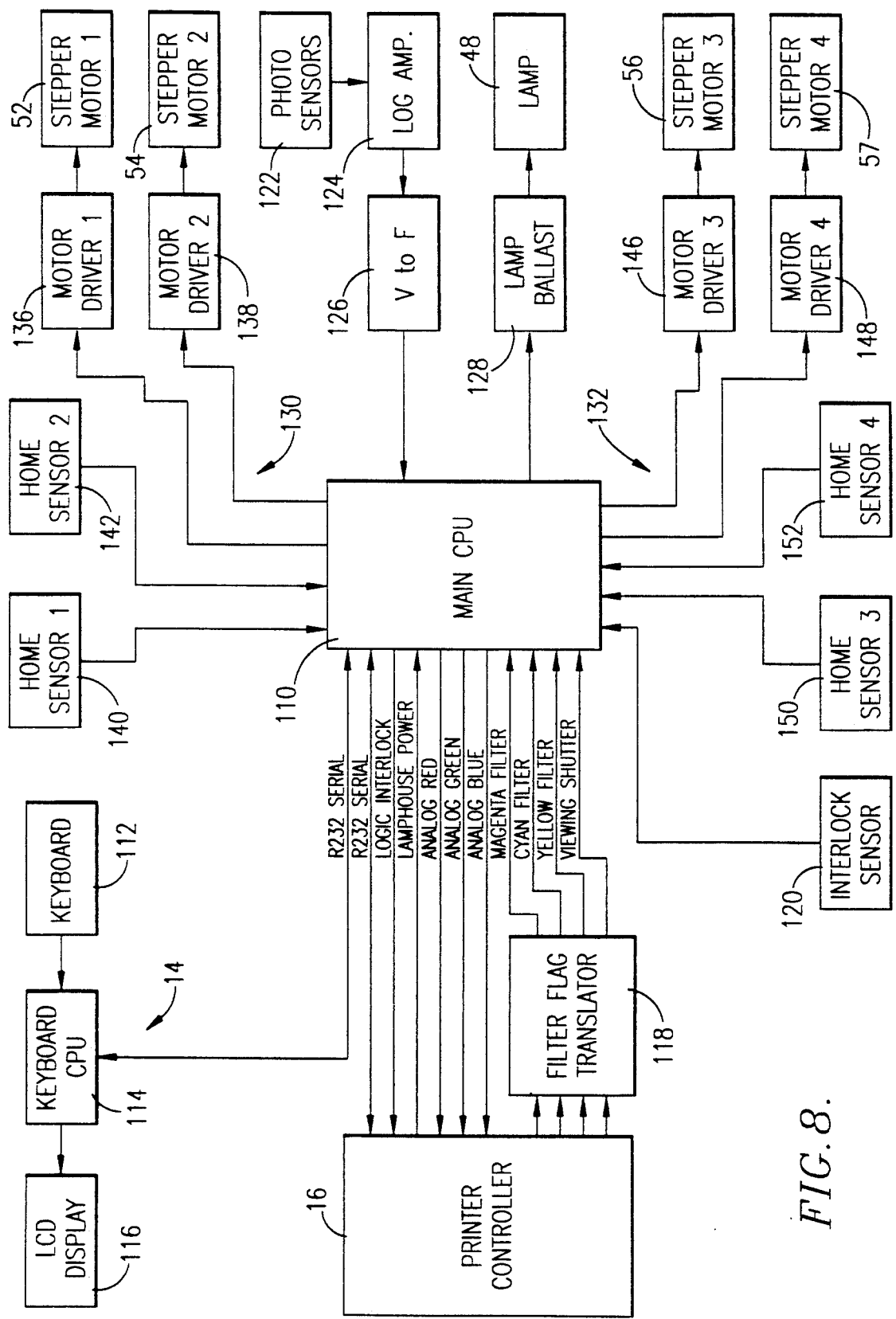
FIG. 8 is an electrical block diagram of the preferred controller for the lamphouse of FIG. 1.

FIG. 8 is an electrical block diagram of lamphouse controller 24 shown connected to printer controller 16. Preferred controller 24 can interface with an existing printer controller such as that found in a Lucht or Kodak variable time mode printer, with a printer operable in the variable intensity mode, or both. Controller 24 includes main central processing unit (CPU) 110 which receives operator inputs entered on keyboard 112 by way of keyboard CPU 114 in RS232 serial format. Keyboard CPU 114 also drives liquid crystal display 116.

Inputs to CPU 110 from printer controller 16 include a signal to initiate lamphouse power, and include magenta, cyan and yellow filter activation signals along with a viewing shutter activation signal by way of filter flag translator 118. In conventional variable time printers, the filter activation and viewing shutter signals are power signals at about 20-40 VDC for activating respective solenoids. Translator 118 conventionally converts these power signals to 5 VDC logic signals. As understood by those skilled in the art, a conventional viewing shutter (not shown) can be inserted in beam 100 to block the major portion thereof in order to reduce the overall intensity of the beam to a much reduced level.

Other inputs to main CPU 110 include a signal from interlock sensor 120 which is a safety switch activated upon opening of the lamphouse chassis, and also include color signals from three photosensors 122 (only one of which is shown in FIGS. 1 and 8) by way of logarithmic amplifier 124 and voltage-to-frequency convertor 126. Photosensors 122 provide feedback to CPU 110 and to printer controller 16 indicating the color composition in terms of the red, green and blue portions of the spectrum of beam 100 as it exits lamphouse 12.

Main CPU 110 provides five outputs to printer controller 16 which include RS232 serial data for interface coordination (handshake), a logic interlock signal indicating activation of interlock sensor 120 so that printer 10 can be shut down, and three analog red, green and blue filter signals representing the color composition data received from photosensors 122. Other outputs from CPU 100 include a signal to lamphouse 128 for energizing lamp 48, and stepper motor control signals to subcircuits 130 and 132.

Subcircuit 130 includes home position sensors 140 and 142 which are conventional photoelectric eyes (not shown) positioned so that the respective beams thereof are blocked by filter disk "notches" 109 when the filters are in their respective reference or "home" positions. Subcircuit 130 also includes motor drivers 136 and 138 which are respectively operable for driving stepper motors 52-54. Subcircuit 132 is configured the same as subcircuit 130 for controlling stepper motor 56, and for controlling stepper motor 63 (not shown in FIGS. 1 and 3). Stepper motor 63 is coupled with mirror 50 for selective rotation thereof in order to deflect beam 100 for reducing the overall intensity thereof at it exits lamphouse 12. Subcircuit 132 includes motor drivers 146 and 148, and home position sensors 150 and 152. Position sensors 150, 152 are also conventional photoelectric eyes (not shown) with sensor 150 operable to interact with notch 109 of filter 56, and sensor 152 operable to interact with similar configured notch (not shown) in mirror 50.

Figure 9A:
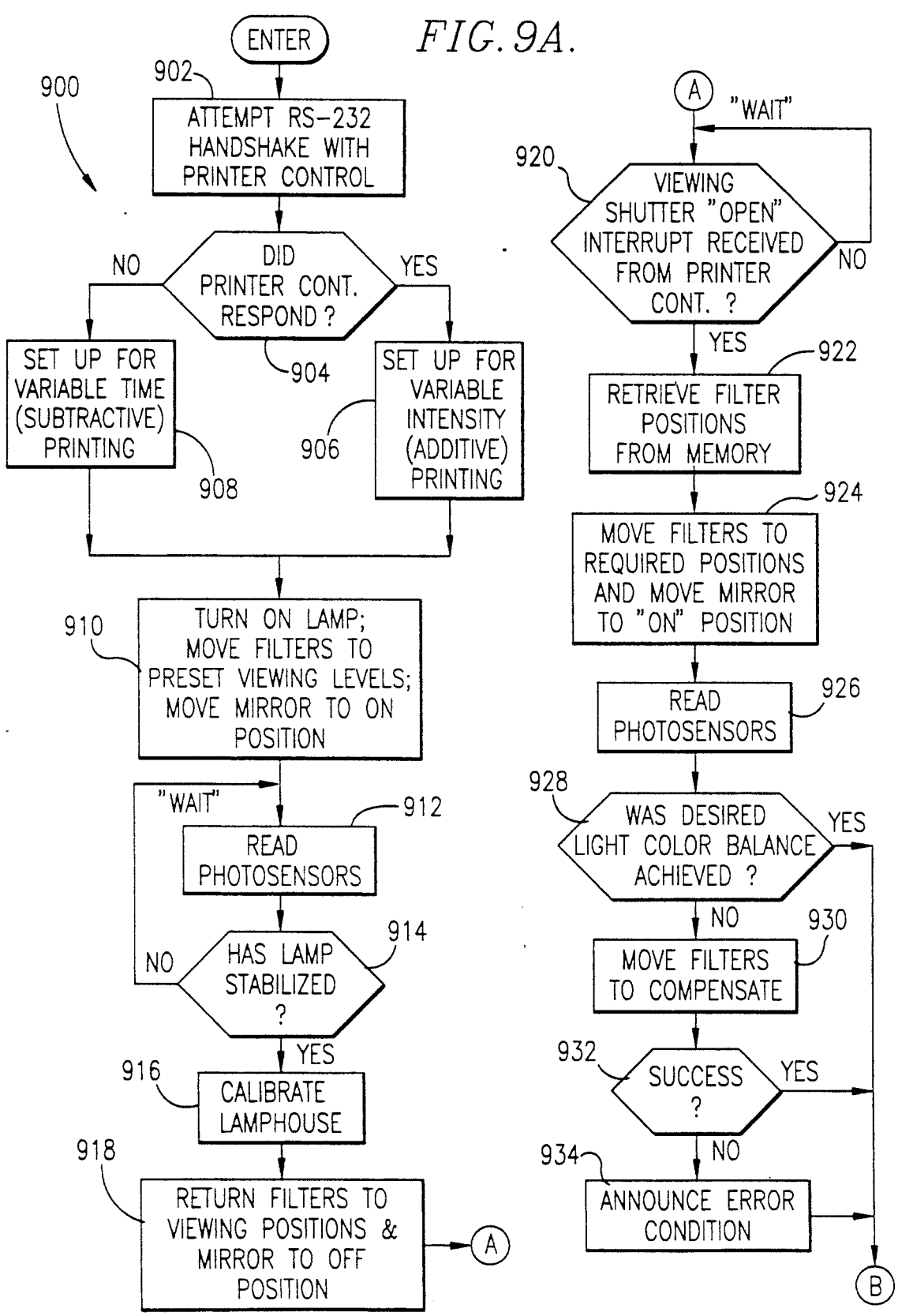
FIG. 9A is a computer program flow chart representing a first portion of a computer program for operating the controller of FIG. 8.
Figure 9B:
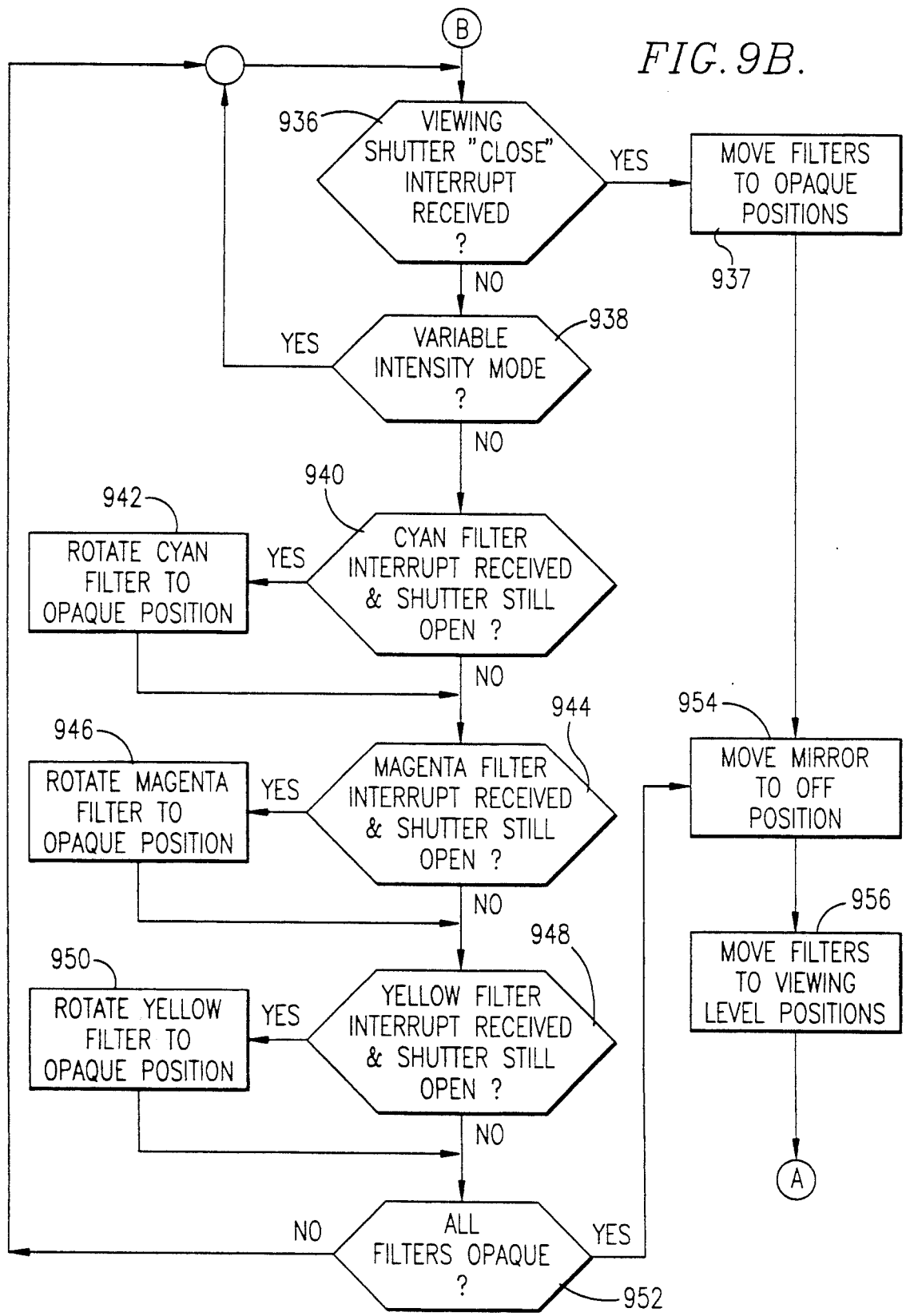
FIG. 9B is a computer program flow chart representing the remaining portion of the computer program of FIG. 9A.

FIGS. 9A and 9B are a computer program flow chart illustrating program 900 for operation of main CPU 110 and thereby lamphouse 12. The program enters at step 902 in which lamphouse CPU 110 attempts a data "handshake" with printer controller 16 over the RS232 serial data line. Step 904 then asks whether communication was established with controller 16. This occurs if printer controller 16 is configured for operation in the variable intensity mode. If yes, step 906 initializes the hardware and software variables for this mode. If the answer in step 904 is no, then it is assumed that printer controller 16 is operable for the variable time mode and step 908 initializes for this mode.

The program next enters step 910 in which CPU 110 energizes lamp 48 by activating lamp ballast 128 for receipt of operating power from power supply 26. This step also moves filters 52-56 to their preset viewing levels and moves mirror 50 to its "on" position. Filters 52-56 function as "trim" filters in addition to their modulation role in order to present an initial spectral composition such as a preset white light balance for viewing and step 910 shifts the filters to these preset positions. Mirror 50 is shiftable by stepper motor 63 between an "on" position as illustrated in FIGS. 1 and 3 and an "off" position. In the "on" position, mirror 50 is presented so that all of beam 100 is reflected to surface 66 along path 102. In the "off" position, mirror 50 is rotated so that only a portion of beam 100 travels along path 102 toward reflective surface 66. In this way, the overall intensity of beam 100 is reduced to a selected level for film viewing, calibration and the like.

Step 912 then reads photosensors 122 and stores the spectral data received therefrom whereupon step 914 asks whether the output from lamp 48 has stabilized. This is achieved by comparing current photosensor data with previous data to determine whether the spectral composition has stabilized indicating that lamp 48 has warmed to its operating temperature. If the answer in step 914 is no, the program continues to loop through steps 912 and 914.

When the answer in step 914 is yes, step 916 calibrates the lamphouse by taking photosensor readings for each position of each filter and stores this data in memory in the form of a look-up data. With this data rapidly accessible, filters 52-56 can be shifted quickly into position to achieve a selected spectral composition for beam 100. After calibration is complete, step 918 returns filters 52-56 to their initial viewing positions and shifts mirror 50 to its "off" position.

Step 920 next asks whether a viewing shutter signal has been received by CPU 110 from printer controller 16 by way of filter flag translator 118. Such a signal indicates that an exposure cycle has been initiated and also shifts the lamphouse viewing shutter to its open position allowing beam 100 to travel along path 102.

The program waits by looping through step 920 until the viewing shutter signal has been received, whereupon step 922 retrieves from memory the appropriate filter positions for either the variable time or variable intensity modes as determined in step 904. Step 924 then shifts filters 52-56 to these positions by activating stepper motors 58-62, and shifts mirror 50 to its "on" position by activating stepper motor 63.

Next, step 926 reads photosensors 122 and step 928 compares the data received therefrom with the spectral data retrieved in step 922 to determine whether the required spectral composition has been achieved. If the answer in step 928 is no, step 930 shifts filters 52-56 using the previously stored, calibration, look-up table data and takes another set of data from photosensors 122. Step 932 then asks whether the filter adjustment was successful. If no, step 934 displays an error condition on LCD 116.

If the answers in steps 928 or 932 are yes, or after step 934, the program moves to step 936 illustrated in FIG. 9B. Step 936 asks whether a viewing shutter "close" signal has been received from printer controller 16 which would indicate the end of the exposure. If yes, the program moves to step 937 which moves filters 52-54 to their respective opaque positions, if not already in these positions. If no, step 938 asks whether the current operating mode is for variable intensity. If yes, the program continues to loop through steps 936 and 938 until a viewing shutter "close" signal has been received which indicates the end of exposure time. In the variable intensity mode, the photographic paper is exposed to the same spectral composition for the entire exposure time and steps 936 and 938 provide the delay for this time.

If the answer in step 938 is no, then lamphouse operation has been set for the variable time mode. In this mode, the first part of the exposure presents the full spectrum to the photographic paper. In subsequent portions of the exposure time, cyan, magenta and yellow filters are then inserted successively in the beam to subtract the respective portions of the spectrum. In the prior art, filter flags have been used for these subtractive functions. After step 938, step 940 asks whether a cyan filter interrupt signal has been received from printer controller 16 and whether the viewing shutter is still open. If the answer is yes, step 942 rotates filter 52 to its opaque position.

If the answer in step 940 is no, or after step 942, step 944 asks whether a magenta filter interrupt signal has been received and whether the viewing shutter is still open. If yes, step 946 rotates magenta filter 54 to its opaque position. After steps 944 or 946, the program moves to step 948 which asks whether a yellow filter interrupt signal has been received from controller 16 and whether the viewing shutter is still open. If yes, step 950 rotates yellow filter 56 to its opaque position.

Step 952 next asks whether all three of filters 52-56 have been rotated to their respective opaque positions. If no, the program loops back to step 936. The program continues to loop through steps 936-952 until all three filters have been shifted to their opaque positions. If the answer in step 952 is yes, or after 937, step 954 shifts mirror 50 to its "off" position. Step 954 is also entered if the answer in step 936 is yes which occurs at the end of the exposure time for the variable intensity mode. Step 956 then moves filters 52-56 to their preset viewing level positions. After step 956, the program loops back to step 920 (FIG. 9A) and waits for initiation of the next exposure cycle.

As those skilled in the art will appreciate, the present invention encompasses many variations of the preferred embodiment described herein. For example, the preferred printer could be an enlarger or duplicator and could also be operable to handle "positives" instead of the preferred negatives. Furthermore, an electronic rendition on an LCD panel, for example, could be used to present the image to be represented on film. In addition, other means for precisely positioning filters 52-56 could be used instead of the preferred stepper motors. As a final example the cooperative nature of the open areas of the filters with the material thereof could be configured as a different type of gradient such as an increasing level of "gray" scale dots so that shifting the filters provides increasing filtering of the respective spectral component.

Having thus described the preferred embodiment of the present invention, the following is claimed as new and desired to be secured by Letters Patent:

We claim:

1. A photographic printing apparatus comprising:
   a light source operable for emitting a beam of visible light;
   a means for directing said light beam along a light path for interacting with a medium carrying an image and for subsequent impingement on an image sensitive medium for producing a representation of said image;
   at least one light filter including a single substrate having filter material operable for filtering a component of the visible spectrum from said beam when placed in the path thereof;
   means for positioning and maintaining said light filter in a selected one of a plurality filtering positions relative to said beam path for filtering said spectral component from a portion of said beam without filtering said component from the remaining portion thereof for achieving a desired intensity of said component in said beam,
   said filter material including a pair of spaced filter material sections with an open area therebetween, said sections cooperating to filter said component from said beam portion, said open area being devoid of filter material for passage of said remaining beam portion therethrough without filtering of said spectral component therefrom,
   said open area presenting an arcuate configuration extending along an arc adjacent the periphery of said light filter,
   said open area further presenting a width between said sections and presenting opposed ends with said width gradually narrowing from one of said ends toward the other said ends,
   said positioning means including means for selectively shifting said filter and thereby said open area relative to said beam to a selected one of a plurality of filtering positions for achieving a selected intensity of said spectral component the shape of said open area being defined so that said intensity of spectral component in the spectral beam varies substantially linearly with said filtering positions.

2. The apparatus as set forth in claim 1, said open area being configured such that the logarithm of the ratio of the total area of said remaining beam portion passing therethrough to the balance of said open area varies linearly with the displacement of said filter relative to said beam.

3. The apparatus as set forth in claim 1, said positioning means including means for selectively positioning said filter so that the center of said beam passes through said open area and so that outer portions of said beam pass through said filter material sections.

4. The apparatus as set forth in claim 3, said filter being rotatable with said open area following an arcuate configuration adjacent the periphery thereof.

5. The apparatus as set forth in claim 4, further including a plurality of said filters with the respective filter materials thereof being operable for filtering different spectral components from said beam.

6. The apparatus as set forth in claim 5, said filter materials including cyan, magenta and yellow respectively.

7. The apparatus as set forth in claim 4, said positioning means including a positioning motor coupled with said filter for rotating said filter to a selected one of said positions.

8. The apparatus as set forth in claim 7, said motor including a stepper motor.

9. The apparatus as set forth in claim 1, said filter including a disk-shaped plate of transparent material having a coating of said filter material thereon.

10. The apparatus as set forth in claim 1, said light source including
    an envelope for containing a gas therein,
    a pair of electrodes within said envelope, and
    a gas contained within said envelope and responsive to electrical stimulation by said electrodes for emitting said light beam.

11. A photographic printing apparatus comprising:
    a light source operable for emitting a beam of visible light, said light source including an enveloped for containing a gas therein, a pair of electrodes within said envelope, and a gas contained within said envelope and responsive to electrical stimulation by said electrodes for emitting said light beam;
    means for directing said light beam along a light path for passage through a film negative and for subsequent impingement on photographic paper having photographic dyes thereon presenting respective spectral intensity peaks substantially corresponding to said sensitivity peaks;

three disk-shaped, light filters respectively including cyan, magenta and yellow filter materials operable for filtering a respective spectral component from said beam, each of said filters being rotatable to a selected one of a plurality of filtering positions relative to said beam path for filtering said respective spectral component from a portion of said beam without filtering said component from the remaining portion of said beam;

means operably coupled with said filters including a pair of spaced filter material sections with an open area therebetween, said sections cooperating to filter said component from said beam portion, said open area being devoid of filter material for passage of said remaining beam portion therethrough without filtering of said spectral component therefrom, each of said open areas presenting an arcuate configuration extending along an arc adjacent the periphery of said light filter, each of said open areas further presenting opposed ends and with the width thereof between said material sections narrowing gradually from one of said ends toward the other thereof for thereby presenting a corresponding filtering gradient said open areas being configured so that said filtering gradient is substantially linear.

12. The apparatus as set forth in claim 10, each of said open areas being configured so that the center of said beam passes therethrough.

13. The apparatus as set forth in claim 12, said rotating means including three positioning motors respectively coupled with said filters for rotation thereof to selected ones of said positions.

14. The apparatus as set forth in claim 13, each of said motors including a stepper motor.

15. The apparatus as set forth in claim 13, each of said motors being operable for rotating said filters to respective full filtering positions wherein all of said beam passes through said filtering materials respectively.

16. The apparatus as set forth in claim 15, each of said open areas presenting a full open position for allowing all of said beam to pass therethrough unattenuated by the associated filter material.

17. The apparatus as set forth in claim 16, further including control means for controlling the operation of said motors in a variable time mode in which said filters are positioned so that at least a portion of said beam passes through said open areas for part of an exposure of the photographic paper to said light beam and in which said filters are subsequently rotated to said full filter positions at the end of said exposure.

18. The apparatus as set forth in claim 16, further including control means for controlling the operation of said motors in a variable intensity mode in which said filters are positioned so that said beam presents respective selected spectral intensities for an entire exposure.

19. The apparatus as set forth in claim 16, further including control means for controlling the operation of said motors in a variable time mode in which said filters are positioned so that at least a portion of said beam passes through said open areas for part of an exposure of the photographic paper to said light beam and in which said filters are subsequently rotated to said full filter positions at the end of said exposure, and means for alternately controlling the operation of said motors in a variable intensity mode in which said filters are positioned so that said beam presents respective selected spectral intensities for an entire exposure.

20. The apparatus as set forth in claim 11, said open area being configured such that the logarithm of the ratio of the total area of said remaining beam portion passing therethrough to the balance of said open area varies linearly with the displacement of said filter relative to said beam.

* * * * *